United States Patent Office 2,833,775
Patented May 6, 1958

2,833,775
SUBSTITUTED PIPERIDINES

Nathan Sperber, Bloomfield, Frank Villani, Cedar Grove, and Domenick Papa, Bloomfield, N. J., assignors to Schering Corporation, Bloomfield, N. J., a corporation of New Jersey No Drawing. Original application August 17, 1951, Serial No. 242,438, now Patent No. 2,739,968, dated March 27, 1956. Divided and this application August 22, 1955, Serial No. 529,902

5 Claims. (Cl. 260—294.7)

This invention relates to a new group of compounds of important physiological properties. More particularly, the invention relates to substituted piperidines having antihistaminic, antispasmodic, antiacetylcholine and analgesic activity, to intermediates for preparing them, and to methods of preparing them.

The substituted piperidines of this invention may be represented by the general formula

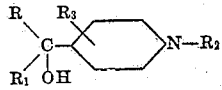

wherein R and $R_1$ are members of the group consisting of aryl, aralkyl, cycloalkyl, cycloalkene, heterocyclic and alkyl groups, $R_2$ is selected from the group consisting of hydrogen, lower alkyl and aralkyl groups, and $R_3$ is selected from the group consisting of hydrogen, chlorine, bromine, lower alkyl and lower alkoxy groups. Representative of the groups R and $R_1$ are phenyl, benzyl, thienyl, pyridyl, pyrimidyl, thiazyl, furyl, cyclohexyl, cyclohexenyl, propyl, isopropyl, butyl and others of these general types as well as their dialkylamino, lower alkoxy and lower alkyl substitution products. This invention also embraces the acid addition salts and the quaternary salts of the compounds of the general formula.

In general, the compounds of the present invention may be prepared by several methods. The most general procedure is that illustrated by the following series of equations for the specific compounds shown:

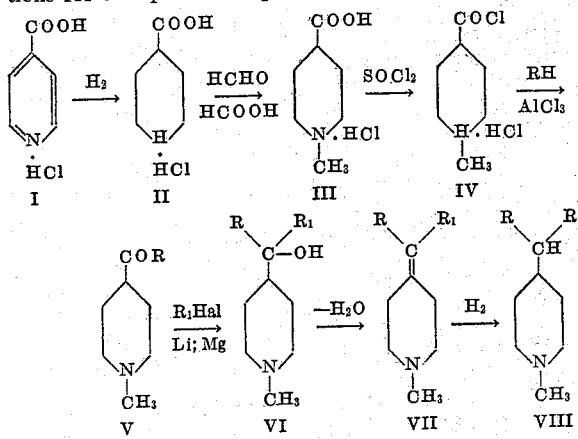

Pyridinecarboxylic acids such as picolinic acid, nicotinic acid, 6-methylnicotinic acid, etc., as such, or in the form of their hydrochlorides, are readily reducible to the corresponding piperidinecarboxylic acids. This reaction is carried out in a low pressure hydrogenator using platinum oxide catalyst or by high pressure hydrogenation using Raney nickel catalyst. Methylation of the piperidine compound proceeds smoothly by any of the known methods (for example, formic acid and formaldehyde) and subsequent treatment of the N-methyl compound with thionyl chloride gives the corresponding acid chloride. Reaction of the acid chloride by any of the usual Friedel-Crafts procedures with an aromatic compound, for example, benzene, thiophene, chlorobenzene, methoxybenzene, etc., yields the keto compounds of type V. Treatment of the latter substance with an organometallic derivative of a halogenated thiophene, pyridine, pyrimidine, thiazole, furan, cycloalkyl or alkyl compound yields the tertiary carbinols of Formula VI. These substances are for the most part high-boiling liquids which can be readily recrystallized to white crystalline solid. Dehydration of the tertiary carbinols to the unsaturated compounds VII is carried out with agents such as thionyl chloride, phosphorous oxychloride, phosphorous tribromide, sulfuric acid, oxalic acid, hydrochloric acid, etc. The choice of reagents and reaction conditions for obtaining the unsaturated compounds of Formula VII is determined by the nature of the quantities R and $R_1$. The methane derivatives of type VIII are obtained by reduction of the unsaturated compounds VII by known methods for the hydrogenation of ethylene compounds.

With the exception of the alkyl and cycloalkyl types, the piperidine compounds VI can be made by the following alternate method which employs as intermediate the pyridine derivatives IX. The latter compounds can be obtained from the corresponding carbinols (J. A. C. S. 70, 3999 (1948); J. A. C. S. 71, 887 (1949)) by replacement of the hydroxyl group by halogen (thionyl chloride) followed by reductive dehalogenation using zinc and acetic acid or any one of several catalytic procedures. The pyridine compound, on oxidation with potassium permanganate, yields the keto compounds X (J. A. C. S. 72, 2722 (1950)) which are then transformed into the tertiary carbinols XI by the same procedures used for the conversion of V to VI. High pressure catalytic hydrogenation of XI simultaneously reduces the pyridine ring, dehydrates the resulting piperidine carbinols (XII) and saturates the newly formed double bond of XIII to yield the methane derivative XIV.

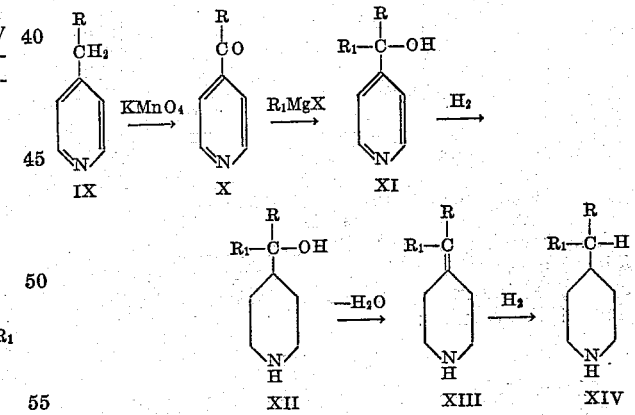

Using the N-alkylpiperidinecarboxylic acids III in the form of the ethyl or methyl esters in the conventional Grignard reaction with, e. g., an aryl, aralkyl, heterocyclic, cycloalkyl or alkyl magnesium halide, the compounds of the general formula are obtained wherein R and $R_1$ are the same. The reaction is illustrated by the following equation for the diphenyl compound from isonipecotic acid:

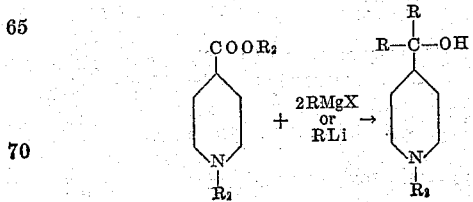

It is readily seen that this reaction yields the carbinols of type VI in one step from the ester of III. This method, as indicated, is, of necessity, limited to those compounds wherein R and $R_1$ are the same. However, in these cases, this procedure has considerable application in view of the number of Grignard reagents of R and $R_1$, which are readily available.

The piperidyl carbinols of type VI can also be prepared by the reactions illustrated by the following equations:

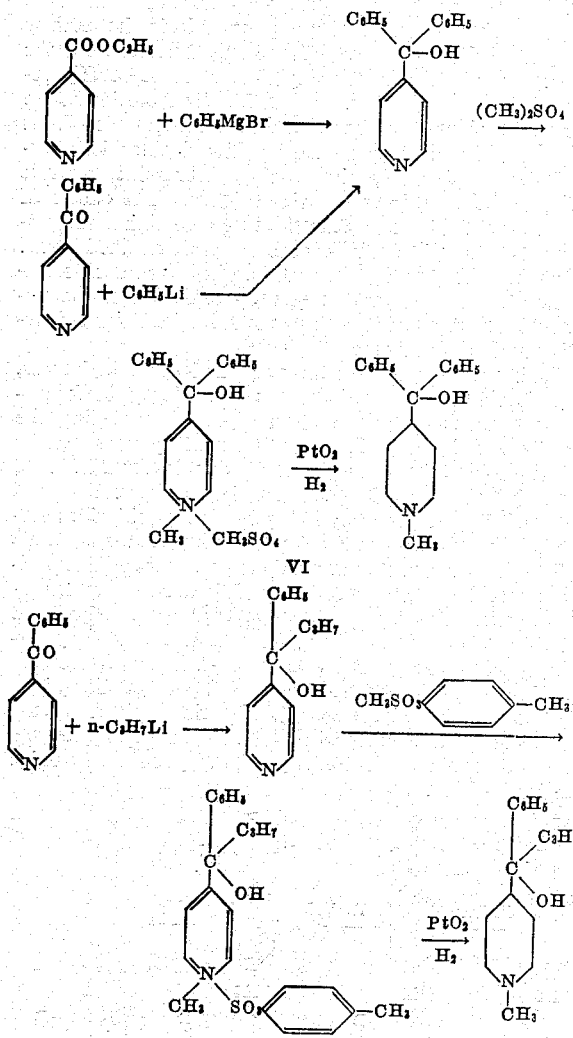

The invention will be further described by way of the following examples, which are, however, presented only by way of illustration and not as indicating the limitations of the invention:

EXAMPLE I

*Phenyl-(2-pyridyl)-(N-methyl-4-piperidyl)carbinol*

Isonipecotic acid hydrochloride: A mixture of 24.6 g. of isonicotinic acid, 100 cc. of water, 3–5 cc. concentrated hydrochloric acid and 1 g. of platinum oxide catalyst is shaken in a Parr apparatus at an initial pressure of about 60 lbs. Within several hours, the theoretical amount of hydrogen is absorbed, the catalyst is removed by filtration and the filtrate concentrated to dryness in vacuo. The solid residue melts at 293° C. with decomposition. The crude product may be purified by washing with cold, absolute ethanol.

The reduction also may be effected by dissolving isonicotinic acid in excess concentrated hydrochloric acid, evaporating the solution to dryness and reducing the hydrochloride salt in aqueous solution with platinum oxide catalyst.

N-methylisonipecotic acid hydrochloride: To 185 g. of 90% formic acid in a one liter flask cooled in an ice bath is added 109 g. of isonipecotic acid hydrochloride, followed by 165 cc. of 37% formalin solution. The mixture is heated and stirred overnight, the solution then concentrated to dryness in vacuo, leaving a slightly gummy, white residue. The latter is dried in a vacuum desiccator over phosphorus pentoxide and recrystallized from absolute ethanol, M. P. 225–226° C.

4-benzoyl-N-methylpiperidine: To 17.5 g. of N-methylisonipecotic acid hydrochloride, in a 500 cc., three-necked flask fitted with a stirrer, dropping funnel and reflux condenser, is added dropwise 125 cc. of thionyl chloride. The mixture is refluxed and stirred for two hours and the excess thionyl chloride removed in vacuo. The flask is then cooled in an ice-salt bath and 140 cc. of dry benzene added. To the stirred mixture, 77 g. of anhydrous aluminum chloride is added during 30 minutes. The reaction mixture is allowed to warm to room temperature, stirred, and refluxed for 18 hours and poured on ice-hydrochloric acid. The benzene layer is extracted with 15% hydrochloric acid and the aqueous acid layers made alkaline with 50% sodium hydroxide solution. The oil which separated is extracted with chloroform, the chloroform extracts dried over sodium sulfate, filtered; and, after removing the solvent, the residue is fractionated, B. P. 122–125° C./0.5–1 mm.

A solution of butyllithium is prepared in ether at −10° C. by reacting 1 g. of lithium, 100 cc. of anhydrous ether and 9.6 g. of dry butylbromide in a nitrogen atmosphere according to the directions of Gilman et al., J. A. C. S. 71, (1949.). The solution of butyllithium is cooled to −40° C. and 11.06 g. of 2-bromopyridine is added dropwise with stirring and the solution stirred for 30 minutes. Then 10.2 g. of 4-benzoyl-N-methylpiperidine in 50 cc. of ether is added drop-wise and the reaction mixture allowed to warm to room temperature slowly and then stirred for an additional seven hours. The mixture is poured on ice and hydrochloric acid, the aqueous phase separated and then made alkaline. The base is taken up in ether and the ether extracts dried. After removal of the solvent, a white solid remains. Recrystallized from benzene, M. P., 122–123° C. Recrystallization from n-hexane raises the melting point to 125° C.

EXAMPLE Ia

*Phenyl-(2-pyridyl)-(N-methyl-4-piperidylidene)methane*

A mixture of 11 g. of phenyl-(2-pyridyl)-(N-methyl-4-piperidyl)carbinol and 70 cc. of thionyl chloride is refluxed on the steam bath for two–ten hours. The excess thionyl chloride is removed in vacuo, 20 cc. of dry benzene added and the solvent distilled in vacuo to remove traces of thionyl chloride. To the oily residue is added slowly, with cooling, excess 25% sodium hydroxide solution. The product is then warmed on the steam bath with stirring for one hour and the oil taken up in benzene, dried, treated with activated carbon, filtered and concentrated to dryness.

Alternatively, a mixture of one part of the piperidyl carbinol and six parts of 85% sulfuric acid is heated at 170° C. for 30 minutes. The solution is poured on cracked ice, made basic with dilute sodium hydroxide and the oily layer extracted with ether. The ether extracts are washed, dried, and after removing the solvent, the residue is distilled in vacuo.

EXAMPLE II

*(p-Chlorophenyl)-(2-pyridyl)-(N-methyl-4-piperidyl)carbinol*

4 - (p-chlorobenzoyl) - N-methylpiperidine.—Twenty-five grams of N-methylisonipecotic acid is converted to the acid chloride and reacted with 394 g. of chlorobenzene and 114 g. of anhydrous aluminum chloride as in Example I. The excess chlorobenzene is removed by steam distillation and the acidic residue extracted with chloroform and the solvent removed by distillation. The residue solidifies and is triturated with cold petroleum ether, M. P. 118–119° C. Recrystallized from n-hexane, M. P. 124° C.

Conversion to the carbinol is carried out as described for the corresponding phenyl compound of Example I. The product is obtained as a viscous yellow oil, B. P. 223–225° C. (5 mm.).

EXAMPLE III

*Diphenyl-(N-methyl-4-piperidyl)carbinol*

To a Grignard solution prepared from 4.9 g. of magnesium, 100 cc. of ether and 31.4 g. of dry bromobenzene is added 18.5 g. of 4-benzoyl-N-methylpiperidine in 200 cc. of dry ether. The reaction mixture is heated with stirring for four hours on the steam bath and then decomposed. The organic layer is separated and the aqueous layer extracted with benzene. The combined organic extracts are concentrated and the residue, diphenyl - (N-methyl - 4 - piperidyl)carbinol, recrystallized from benzene-petroleum ether, M. P. 130–131° C. The Grignard complex may also be decomposed with ice and hydrochloric acid and the insoluble hydrochloride of the carbinol isolated directly.

EXAMPLE IIIa

*Diphenyl-(N-methyl-4-piperidylidene) methane*

The carbinol may be converted to the unsaturated compound as described in Example Ia. Alternatively, the carbinol can be dehydrated with 60% sulfuric acid. In general, to one part of the carbinol there is added 10 parts of 60% sulfuric acid. The mixture after heating for six hours is poured onto cracked ice, the solution made alkaline with dilute sodium hydroxide and the oily basic layer extracted with ether. The ether extracts after washing with water are dried over sodium sulfate, and after removing the ether, the residue is distilled in vacuo, M. P. 52–53° C.

Alternatively, a solution of 40 g. of (4-pyridyl)-diphenylcarbinol (prepared as shown in the equation in column 3, lines 10 to 52) in 100 ml. of dimethyl sulfate is heated on the steam bath for one hour. The dark brown solution is diluted with 500 cc. of benzene and the lower dark brown oily layer is separated and dissolved in 150 cc. of absolute ethanol. The resulting solution is reduced at 50 lbs. hydrogen pressure with 1.5 g. of platinum oxide catalyst until the theoretical amount of hydrogen is absorbed. The catalyst is filtered off, the filtrate concentrated and the residue dissolved in 300 ml. of water. Addition of dilute sodium hydroxide gives a viscous dark oil which is extracted with benzene and after removal of the benzene in vacuo, the residue is dissolved in 300 cc. of 60% sulfuric acid. The resulting acid solution is heated for six hours on the steam bath and poured onto a mixture of ice and water. The resulting aqueous solution is made alkaline with sodium hydroxide. The liberated oil is extracted with ether and after drying the ether solution and removing the ether, the residue is distilled. The product (N-methyl-4-piperidylidene)-1,1-diphenylmethane obtained is identical with that secured by the foregoing procedure.

In place of dimethyl sulfate, the pyridyl carbinol can be quaternized with methyl iodide, methyl bromide, methyl chloride, methyl-p-toluene sulfonate and other similar reagents. In place of platinum oxide catalyst there can be used Raney nickel at slightly higher pressures, palladium on carbon, platinum black and other similar catalytic materials.

EXAMPLE IV

*(p-Chlorophenyl)-phenyl-(N-methyl-4-piperidyl)carbinol*

This carbinol is prepared by reaction of 4-(p-chlorobenzoyl)-N-methylpiperidine with phenylmagnesium bromide as in Example II. M. P. 142° C. from n-hexane.

EXAMPLE V

*Phenyl-(2-pyridyl)-(N-methyl-4-piperidyl)-carbinol hydrochloride*

The hydrochloride is prepared in the conventional manner from the carbinol of Example I and anhydrous hydrogen chloride in absolute ether. The melting point of the crude hydrochloride is 85–90° C. It may be purified by recrystallization from a mixture of absolute alcohol and ether.

EXAMPLE VI

*Phenyl-(2-pyridyl)-(N-methyl-4-piperidyl)-carbinol methiodide*

This quaternary salt is prepared from the carbinol of Example I and methyl iodide in the usual manner. The methiodide is a white, crystalline compound melting at 223.5–224.5° C.

EXAMPLE VII

*Diphenyl-(N-methyl-4-piperidyl) carbinol hydrochloride*

This hydrochloride is prepared in the conventional manner from the carbinol of Example III and anhydrous hydrogen chloride. The crude hydrochloride melts at 252° C. and after several recrystallizations from absolute alcohol and ether mixture, an analytically pure sample melts at 290° C.

EXAMPLE VIII

*(p-Methoxyphenyl)-(2-pyridyl)-N-methyl-4-piperidyl) carbinol*

The compound of this example is prepared as described for the unsubstituted compound of Example I, except that anisole is used in place of the benzene in the Friedel-Crafts reaction. The 4-(p-methoxybenzoyl)-N-methylpiperidine is obtained as a pale yellow liquid boiling at 136–139° C. (2 mm.). Reaction of this ketonic material with 2-pyridyllithium proceeds as described for the unsubstituted compound.

EXAMPLE IX

*Phenyl-(p-methoxyphenyl)-(N-methyl-4-piperidyl) carbinol*

This compound is prepared in accordance with the procedure of Example I substituting p-methoxybromobenzene for the 2-bromopyridine in the lithium reaction. B. P. 202–209° C. (2 mm.); M. P. 128–129° C.

EXAMPLE X

*Diphenyl-(N-methyl - 4 - piperidyl) carbinol methiodide*

This salt is prepared from the free base of Example III and methyl iodide, M. P. 266–267° C.

EXAMPLE XI

*Phenyl-cyclohexyl-(N-methyl-4-piperidyl) carbinol*

To a solution of cyclohexyl magnesium chloride (32 g. of chlorocyclohexane and 6.5 g. magnesium) in 500 cc. of ethyl ether, there is added 27 g. of N-methyl-4-benzoyl-piperidine. Following the addition, the mixture is refluxed on the steam bath for four hours and after standing overnight is decomposed by pouring into a mixture of ice and hydrochloric acid. The tertiary base which separates is obtained in the form of the hydrochloride and in this crude state the hydrochloride melts at 203–205° C. The crude hydrochloride is dissolved in water, the solution made alkaline with 50% NaOH and the oil which separates is extracted with ether. The ether extracts are evaporated and the residue is crystallized from n-hexane or benzene, M. P. 144–145° C.

EXAMPLE XII

*Phenyl-cyclohexyl-(N-methyl-4-piperidyl)carbinol methiodide*

This salt is prepared from the free base of the previous example and methyl iodide, M. P. 254.5–255° C.

EXAMPLE XIII

*Phenyl-cyclohexyl-(N-methyl-4-piperidyl)carbonol*

This carbinol is prepared from 4-benzoyl-N-methylpiperidine and 2-bromothiophene. M. P. 141–142° C. after recrystallization from ethyl alcohol.

EXAMPLE XIV

*Phenyl-(2-thienyl)-(N-methyl-4-piperidyl)carbinol hydrochloride*

This compound is prepared from the carbinol of Example XIII and anhydrous hydrogen chloride, M. P. 238–239° C.

EXAMPLE XV

*Diphenyl-(N-methyl-4-piperidyl)carbinol*

Diphenyl-(N-methyl-4-piperidyl)carbinol may also be prepared in the following manner: To a solution of phenyl-magnesium bromide (prepared from 10.1 g. of magnesium and 66 g. of bromobenzene) in 100 cc. of ether, is added 22 g. of methyl-N-methylisonipecotate in 100 cc. of toluene. After heating for two hours on the steam bath, the reaction mixture is poured onto ice and dilute hydrochloric acid. The white solid is filtered and dissolved in hot water. The resulting solution is made basic with dilute sodium hydroxide, the liberated oil is extracted with chloroform, the chloroform layer is dried and concentrated. The carbinol is obtained as a white crystalline solid, which melts at 130–131° C.

EXAMPLE XVI

*Di-(2-thienyl)-(N-ethyl-4-piperidyl)carbinol*

This carbinol is prepared from the ethyl ester of N-ethyl-isonipecotic acid and 2-thienyl magnesium bromide in accordance with the procedure of the preceding example. The compound is obtained as a white crystalline solid which on recrystallization from ethanol melts at 120–121° C.

EXAMPLE XVII

*Phenyl-benzyl-(N-methyl-4-piperidyl)carbinol*

This carbinol is prepared from N-methyl-4-benzoyl piperidine and benzyl magnesium chloride in the conventional Grignard reaction. The carbinol is obtained as a white crystalline solid melting at 116–117° C.

EXAMPLE XVIII

*Phenyl-benzyl-(N-methyl-4-piperidyl)carbinol hydrochloride*

This compound is prepared from the carbinol of the previous example and anhydrous hydrogen chloride, M. P. 244–245° C.

EXAMPLE XIX

*Phenyl-(n-propyl)-(N-methyl-4-piperidyl)carbinol*

This compound is prepared from 4-benzoyl-N-methylpiperidine and propyl magnesium bromide in accordance with the conventional Grignard procedure. The compound is a free-flowing pale yellow liquid boiling at 137–143° C./1 mm.

EXAMPLE XX

*Phenyl-(n-propyl)-(N-methyl-4-piperidyl)carbinol ethiodide*

This compound is prepared from the carbinol of the preceding example and ethyl iodide, M. P. 197–198° C.

EXAMPLE XXI

*Phenyl-isopropyl-(N-methyl-4-piperidyl)carbinol*

This compound is prepared as described for the compound of Example XIX using isopropyl magnesium bromide, B. P. 130–135° C./1–2 mm.

EXAMPLE XXII

*Diphenyl-(N-ethyl-4-piperidyl)carbinol*

This compound is made by the procedure of Example XV wherein methyl-N-ethylisonipecotate is reacted with phenyl magnesium bromide. The carbinol is obtained as a white, crystalline solid, which melts at 93–94° C.

EXAMPLE XXIII

*Diphenyl-(N-isopropyl-4-piperidyl)carbinol*

From methyl-N-isopropylisonipecotate and phenyl magnesium bromide by the procedure of Example XV, M. P. 133–134° C.

EXAMPLE XXIV

*Di-(p-methylphenyl)-(N-methyl-4-piperidyl)carbinol*

From methyl-N-methylisonipecotate and p-methylphenyl magnesium bromide by the procedure of Example XV, M. P. 190–191° C.

EXAMPLE XXV

*Diphenyl-(N-n-propyl-4-piperidyl)carbinol*

From methyl-N-propylisonipecotate and phenyl magnesium bromide by the procedure of Example XV, M. P. 125–126° C.

EXAMPLE XXVI

*Diphenyl-(N-isobutyl-4-piperidyl)carbinol*

From methyl-N-isobutylisonipecotate and phenyl magnesium bromide by the procedure of Example XV, M. P. 136–137° C.

EXAMPLE XXVII

*Di-(p-methoxyphenyl)-(N-methyl-4-piperidyl)carbinol*

From methyl-N-methylisonipecotate and p-methoxyphenyl magnesium bromide by the procedure of Example XV, M. P. 161–162° C.

EXAMPLE XXVIII

*Di-(cyclohexyl)-(N-methyl-4-piperidyl)carbinol*

From methyl-N-methylisonipecotate and cyclohexyl magnesium bromide by the procedure of Example XV, M. P. 126–127° C.

EXAMPLE XXIX

*Phenyl-ethyl-(N-methyl-4-piperidyl)carbinol*

From the 4-benzoyl-N-methylpiperidine of Example I and ethyl magnesium bromide by the procedure of Example XIX, M. P. 108–109° C.

EXAMPLE XXX

*Phenyl-(m-chlorophenyl)-(N-methyl-4-piperidyl)carbinol*

By the procedure of Example XXIX substituting m-chlorophenyl magnesium bromide for ethyl magnesium bromide, M. P. 135–136° C.

EXAMPLE XXXI

*Phenyl-(p-methylphenyl)-(N-methyl-4-piperidyl)carbinol*

By the procedure of Example XXIX substituting p-methylphenyl magnesium bromide for ethyl magnesium bromide, M. P. 143–144° C.

EXAMPLE XXXII

*Phenyl-(n-hexyl)-(N-methyl-4-piperidyl)carbinol*

By the procedure of Example XXIX wherein n-hexyl magnesium bromide is substituted for ethyl magnesium bromide, B. P. 164–167° C. (1 mm.).

EXAMPLE XXXIII

*Phenyl-(n-butyl)-N-methyl-4-piperidyl(carbinol)*

By the procedure of Example XXIX wherein n-butyl magnesium bromide is substituted for ethyl magnesium bromide, 140–145° C. (3 mm.).

EXAMPLE XXXIV

*Phenylisobutyl-(N-methyl-4-piperidyl) carbinol*

By the procedure of Example XXIX wherein isobutyl magnesium bromide is substituted for ethyl magnesium bromide, M. P. 112–113° C.

EXAMPLE XXXV

*Phenyl-(Δ¹-cyclohexenyl)-(N-methyl-4-piperidyl)carbinol*

By the procedure of Example XXIX substituting Δ¹-cyclohexenyl magnesium bromide for ethyl magnesium bromide, B. P. 176–182° C. (2 mm.); M. P. 104–105° C.

EXAMPLE XXXVI

*Phenyl(n-propyl)-(N-ethyl-4-piperidyl)carbinol*

The requisite intermediate, 4-benzoyl-N-ethyl-piperidine, is prepared from N-ethylisonipecotic acid hydrochloride and benzene with aluminum chloride in accordance with the procedure of Example I. The resulting 4-benzoyl-N-ethyl-piperidine is then treated with n-propyl magnesium bromide in accordance with the procedure of Example XXIX. The resulting carbinol is a pale yellow liquid boiling at 144–147° C. (1 mm.).

EXAMPLE XXXVII

*Phenyl-(2-thienyl)-(N-ethyl-4-piperidyl)carbinol*

By the procedure of Example XXXVI wherein 2-thienyl magnesium bromide is substituted for the n-propyl magnesium bromide, B. P. 196–198° C. (2 mm.); M. P. 104–105° C.

EXAMPLE XXXVIII

*p-Chlorophenyl-(n-propyl)-(N-methyl-4-piperidyl) carbinol*

From 4-(p-chlorobenzoyl)-N-methylpiperidine and n-propyl magnesium bromide, M. P. 135–136° C.

EXAMPLE XXXIX

*p-Methoxyphenyl-(n-propyl)-(N-methyl-4-piperidyl) carbinol*

From 4-(p-methoxybenzoyl)-N-methylpiperidine and n-propyl magnesium bromide, B. P. 165–170° C. (2 mm.).

EXAMPLE XL

*Phenyl-(n-propyl)-(N-isopropyl-4-piperidyl)carbinol*

From 4-benzoyl-N-isopropylpiperidine and n-propyl magnesium bromide, B. P. 143–153° C. (0.5 mm.).

Of particular utility for medicinal purpose are the piperidylidene compounds of the general formula

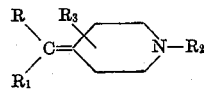

In general, enhancement of the antiacetylcholine, ganglionic and parasympathetic blocking activities is achieved by forming the quaternary salts such as the methiodide, methochloride, methobromide, methosulfate, ethiodide, p-toluenesulfonate, etc., of the tertiary nitrogen atom. The quaternary salts of the piperidylidene compounds, for example, diphenyl-(N,N-dimethyl-4-piperidylidene)methane methylsulfate, are particularly advantageous in the control of gastric secretion and gastric motility in ulcer patients. In addition to the quaternary salts, acid addition salts such as the hydrochloride, tartarate, maleate, citrate and salicylate of the piperidine compounds of the general formula, for example, phenyl-(n-propyl)-(N-methyl-4-piperidylidene)methane citrate, have also been found to be effective. The latter salts are particularly useful in those cases where solutions of the amines of the invention are to be used.

This application is a division of our application Serial No. 242,438, filed August 17, 1951, which is a continuation-in-part of our application Serial No. 199,364, filed December 5, 1950.

We claim:

1. Piperidyl carbinols of the group consisting of compounds of the general formula

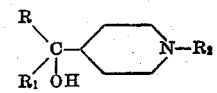

wherein R and $R_1$ are selected from the group consisting of phenyl, chlorophenyl, and lower alkylphenyl, lower alkoxyphenyl, and $R_2$ is selected from the group consisting of hydrogen and lower alkyl, and their non-toxic acid addition salts and quaternary salts.

2. Diphenyl-(N-methyl-4-piperidyl)carbinol.

3. Phenyl - (m-chlorophenyl) - (N-methyl-4-piperidyl) carbinol.

4. Phenyl - (p-chlorophenyl) - (N - methyl-4-piperidyl) carbinol.

5. Diphenyl-(N-ethyl-4-piperidyl)carbinol.

References Cited in the file of this patent

FOREIGN PATENTS 621,231     Great Britain _____ Apr. 6, 1949

OTHER REFERENCES

Tilford et al.: Jour. Am. Chem. Soc., vol. 70, pp. 4001–09 (1948).